United States Patent
Lewin et al.

(10) Patent No.: US 11,233,749 B2
(45) Date of Patent: Jan. 25, 2022

(54) EXTERNAL ACCESS TO INTERNAL NETWORK RESOURCE

(71) Applicant: MICROSOFT TECHNOLOGY LICENSING, LLC, Redmond, WA (US)

(72) Inventors: Guy Lewin, HaSharon (IL); Vitaly Khait, Yavne (IL); Yossi Haber, Gannei Tikva (IL); Ami Luttwak, Binyamina (IL); Alexander Esibov, Seattle, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/661,838

(22) Filed: Oct. 23, 2019

(65) Prior Publication Data

US 2021/0126872 A1 Apr. 29, 2021

(51) Int. Cl.
*G06F 16/955* (2019.01)
*H04L 12/917* (2013.01)
*G06N 5/02* (2006.01)
*H04L 12/911* (2013.01)
*H04L 29/08* (2006.01)

(52) U.S. Cl.
CPC ............ *H04L 47/76* (2013.01); *G06F 16/955* (2019.01); *G06N 5/025* (2013.01); *H04L 47/827* (2013.01); *H04L 67/2852* (2013.01)

(58) Field of Classification Search
None
See application file for complete search history.

(56) References Cited

U.S. PATENT DOCUMENTS

| | | | | |
|---|---|---|---|---|
| 2005/0138004 A1* | 6/2005 | Teplitsky | ............ | G06F 16/9566 |
| 2006/0026287 A1* | 2/2006 | Ternullo | .................... | G06F 9/54 |
| | | | | 709/227 |
| 2006/0031929 A1* | 2/2006 | Saito | ................... | H04L 63/0428 |
| | | | | 726/11 |
| 2009/0327466 A1* | 12/2009 | Lopez | ................... | H04L 61/301 |
| | | | | 709/223 |

(Continued)

OTHER PUBLICATIONS

Vangel, et al., "Overview of Office 365 ATP Safe Links", Retrieved from: https://docs.microsoft.com/en-us/office365/securitycompliance/atp-safe-links, May 17, 2019, 4 Pages.

(Continued)

*Primary Examiner* — Joshua Joo
(74) *Attorney, Agent, or Firm* — Workman Nydegger (57) ABSTRACT

Providing fluid external access to a resource that is internal to a network from external to that network. From within the network, the internal user simply provides an internal identifier, and the external user accesses not the internal identifier, but an external uniform resource identifier (URL) that the external user can simply select to obtain access to the internal resource of the network. This is accomplished by translating the internal identifier to an external URL having a proxy server as its domain name. When the external URL selects the URL, a request with that external URL is made to the proxy server, which translates the external URL back to the internal identifier, and coordinates with the network to obtain the resource for the external user.

18 Claims, 8 Drawing Sheets

(56) References Cited

U.S. PATENT DOCUMENTS

| | | | |
|---|---|---|---|
| 2010/0186079 A1* | 7/2010 | Nice | H04L 61/1511 |
| | | | 726/14 |
| 2011/0078553 A1* | 3/2011 | Reimann | G06F 40/00 |
| | | | 715/234 |
| 2015/0248484 A1* | 9/2015 | Yu | H04L 61/15 |
| | | | 707/711 |
| 2018/0089207 A1* | 3/2018 | Matsui | G06F 40/197 |
| 2018/0176176 A1* | 6/2018 | Kapur | H04L 67/10 |
| 2020/0153928 A1* | 5/2020 | Chauhan | H04L 63/0428 |
| 2020/0329116 A1* | 10/2020 | Chauhan | H04L 67/2842 |

OTHER PUBLICATIONS

"International Search Report and Written Opinion Issued in PCT Application No. PCT/US20/055295", dated Dec. 10, 2020, 11 Pages.

* cited by examiner

EXTERNAL ACCESS TO INTERNAL NETWORK RESOURCE

BACKGROUND

Uniform resource locators are identifiers used to locate resources in a network. Thus, uniform resource locators are also called "web addresses" though uniform resource locators may be used to access resources from networks other than the World Wide Web. As an example, sometimes internal uniform resource locators are used to access resources from within a local or corporate network. Such uniform resource locators may be shared with others within the network so that those within the network may use the internal uniform resource locator to access the internal resource of the network.

Sometimes, in an attempt to share the resource with those outside the network, an authorized user from within the network might provide the internal uniform resource locator to a person outside the network. However, when that external person selects the internal uniform resource locator (e.g., by selecting the associated link), the external person will be given a failure message. This is because a global domain name server cannot resolve the internal uniform resource locator into a network address (e.g., an Internet Protocol (IP) address).

There are ways to work around this problem. For instance, the external person might establish a Virtual Privacy Network (VPN) connection to thereby effectively become within the network. Alternatively, the external user might also contact an administrator of the network to allow access to the resource. There might also be a portal that the external user can log into to obtain access to the internal resource. All of these methods require manual intervention.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to externally providing access to a resource that is internal to a network. From within the network, the internal user simply provides an internal identifier (such as an internal uniform resource locator), and the external user accesses not the internet identifier, but an external uniform resource identifier that the external user can simply select to obtain access to the internal resource of the network.

In accordance with the principles described herein, a translation component accesses an internal identifier (e.g., an internal uniform resource locator) that is resolvable, using an internal domain name server within a network, to an internal network address of a resource within the network. This internal uniform resource locator is not resolvable by an external global domain name server, but perhaps is just resolvable by a domain name server that is specific to the network. The translation component automatically determines that an external uniform resource locator is to be generated using the internal uniform resource locator (e.g., by performing pattern matching on the accessed internal uniform resource locator).

In response to the determination, an external uniform resource locator is generated so as to be structured to be resolved by the external global domain name server to a server computing system (e.g., a proxy server for the network). This generation may be rules-based by, for instance, inserting the domain name of the server computing system within the external uniform resource locator, and inserting the internal identifier within a path and/or parameter of the external uniform resource locator.

Thus, when the external user selects the external uniform resource locator, a request is automatically made to that server computing system. That server then obtains the internal identifier from the external uniform resource locator, and uses an internal domain name server that is internal to the network to obtain access to the resource on behalf of the external user. Thus, the automatic mechanism provides fluid access to an internal resource from external to a network. The process is fluid as the users need make no special effort beyond what would normally be done in sharing uniform resource locators.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to externally providing access to a resource that is internal to a network. From within the network, the internal user simply provides an internal identifier (such as an internal uniform resource locator), and the external user accesses not the internet identifier, but an external uniform resource identifier that the external user can simply select to obtain access to the internal resource of the network.

In accordance with the principles described herein, a translation component accesses an internal identifier (e.g., an internal uniform resource locator) that is resolvable, using an internal domain name server within a network, to an internal network address of a resource within the network. This internal uniform resource locator is not resolvable by an external global domain name server, but perhaps is just resolvable by a domain name server that is specific to the network. The translation component automatically determines that an external uniform resource locator is to be generated using the internal uniform resource locator (e.g., by performing pattern matching on the accessed internal uniform resource locator).

In response to the determination, an external uniform resource locator is generated so as to be structured to be resolved by the external global domain name server to a server computing system (e.g., a proxy server for the network). This generation may be rules-based by, for instance, inserting the domain name of the server computing system within the external uniform resource locator, and inserting the internal identifier within a path and/or parameter of the external uniform resource locator.

Thus, when the external user selects the external uniform resource locator, a request is automatically made to that server computing system. That server then obtains the internal identifier from the external uniform resource locator, and uses an internal domain name server that is internal to the network to obtain access to the resource on behalf of the external user. Thus, the automatic mechanism provides fluid access to an internal resource from external to a network. The process is fluid as the users need make no special effort beyond what would normally be done in sharing uniform resource locators.

This detailed description will be organized as follows. First, the network environment in which the principles described herein may be practiced will be described with respect to FIGS. 1 through 3. Then the process performed by the various components of that environment in order to allow external access to internal resources of a network will be described with respect to FIGS. 4 through 7. Finally, because the principles described herein operate in the context of a computer system, a computer system will be described with respect to FIG. 8.

Figure 1:
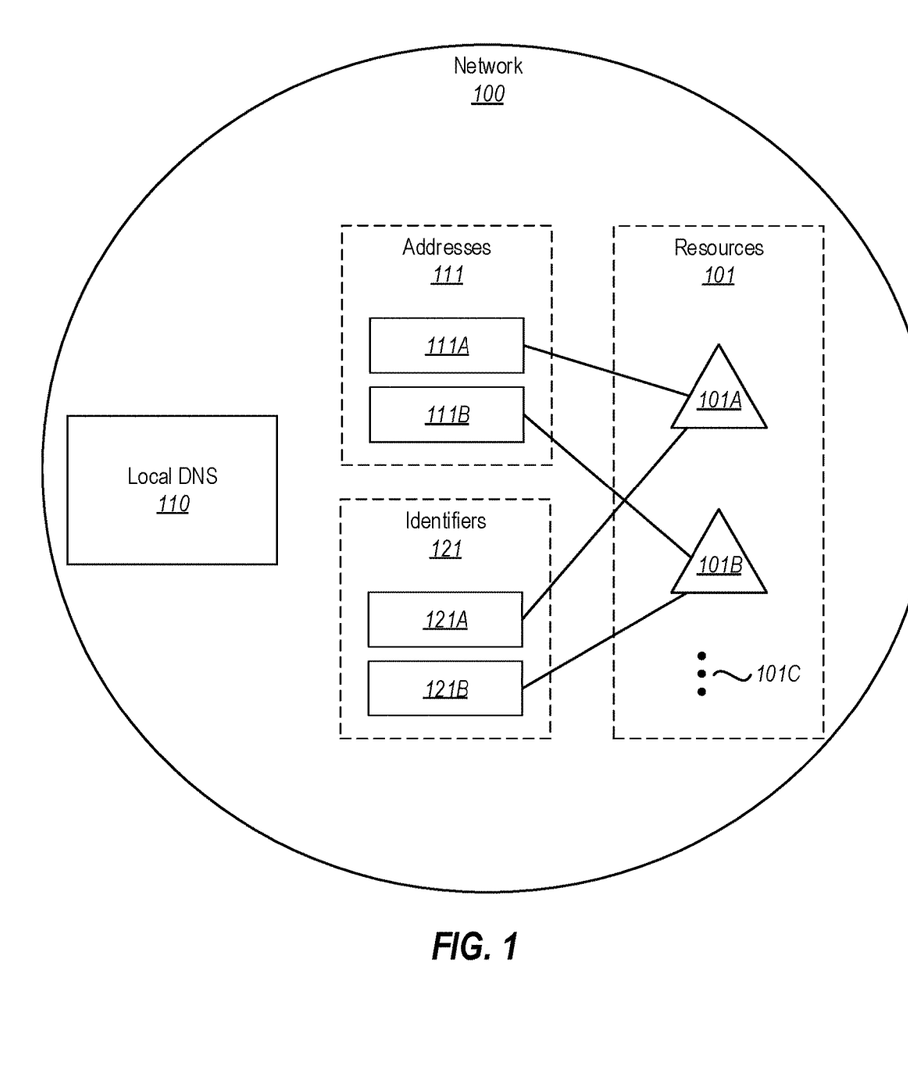
FIG. 1 illustrates a network that has internal resources that may be externally accessed in accordance with the principles described herein.

FIG. 1 illustrates a network 100 that may be externally accessed in accordance with the principles described herein. The network 100 includes multiple internal resources 101. The network 100 is represented as a circle to symbolize that the network 100 is a protected network that has confidential resources that are contained therein. For instance, the network 100 might be a corporate network that employees of the corporation may connect to in order to access internal resources of the network 100.

The internal resources 101 (represented symbolically as triangles in FIG. 1) may be any identifiable thing that can be retrieved from the network using a network address (e.g. an Internet Protocol (IP) address). As an example, the internal resources 101 could be documents, files, data, web pages, files, credentials, databases, devices, computing systems, sessions (such as collaborative authoring, conferencing, and so forth), classes, properties, or any other identifiable thing retrievable over a network. In the example of FIG. 1, the internal resources 101 are illustrated as including two internal resources 101A and 101B. As represented by ellipsis 101C, the network 100 may include any number of internal resources, which is typically many more than just two. However, the two internal resources 101A and 101B are illustrated for purposes of simplicity.

Each internal resource 101 has a network address 111 (such as an Internet Protocol (IP) address) that may be used to address, and ultimately access, the associated internal resource. For instance, internal resource 101A has an associated network address 111A, and internal resource 101B has an associated network address 111B. The network addresses may be used by the network protocol layer (e.g., the IP layer) of the network communication stack in order to route requests for the internal resource, and retrieve the internal resource.

Internal identifiers (often called uniform resource identifiers or uniform resource locators) are often used to identify resources as they can be more human-readable and intuitive than a network address. Accordingly, each internal resource 101 also potentially has an internal identifier 121 that may be resolved by a local domain name server 110 into the network address 111 for that internal resource 101. The identifiers are referred to as "internal" because they cannot be resolved into the network address using a global domain name server that is external to the network 101.

For instance, the internal identifier 121A is assigned to the internal resource 101A, and the internal identifier 121B is assigned to the internal resource 101B. Accordingly, when an internal user wants to access the internal resource 101A, the user provides the internal identifier 121A to the local domain name server 110, which resolves the internal identifier 121A into the network address 111A, which may then be used to access the internal resource 101A. Likewise, when an internal user wants to access the internal resource 101B, the user provides the internal identifier 121B to the local domain name server 110, which resolves the internal identifier 121B into the network address 111B, which may then be used to access the internal resource 101B. Thus, the local domain name server 110 acts to facilitate access to internal network resources within the network 100.

Figure 2:
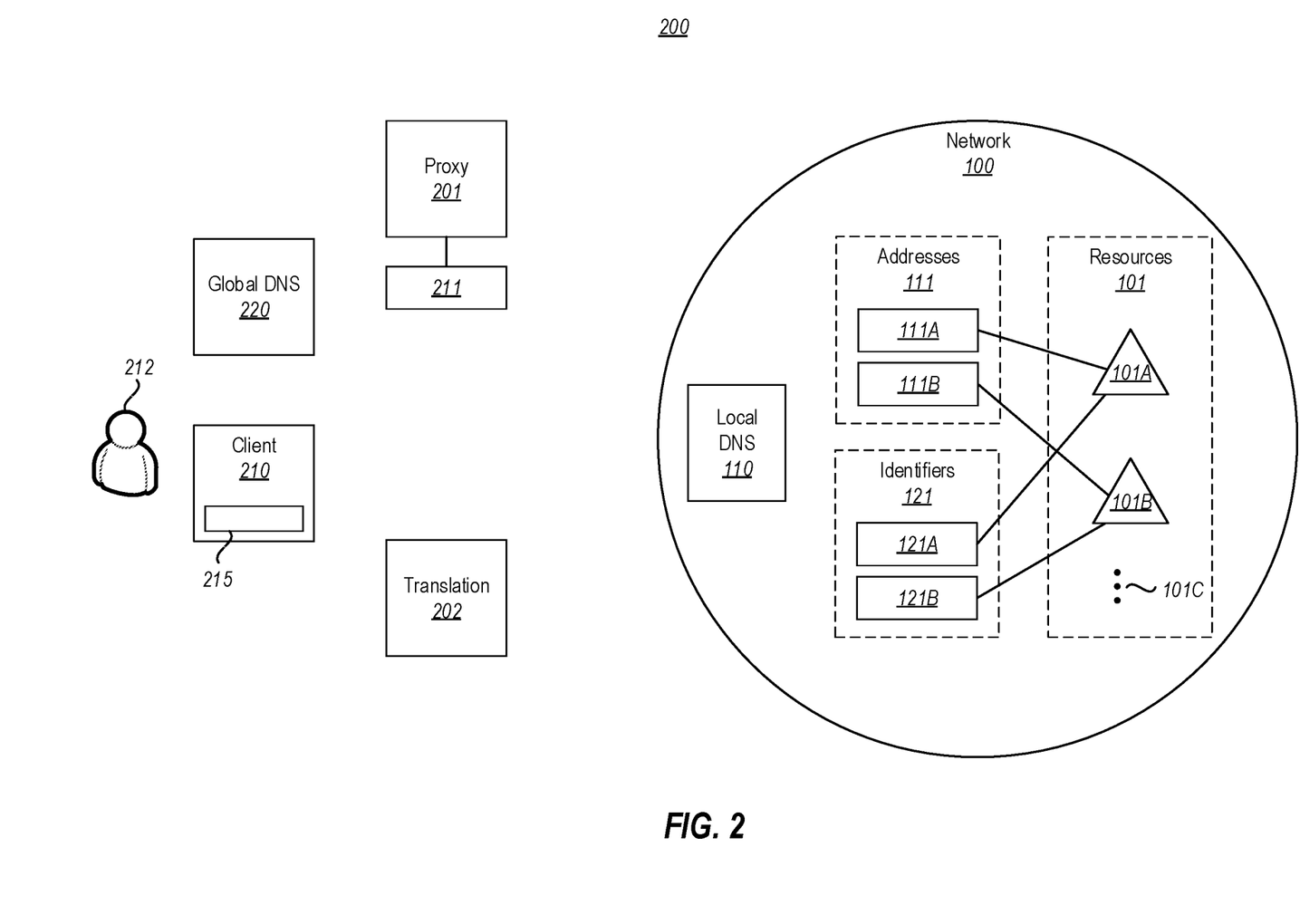
FIG. 2 illustrates an environment in which the principles described herein may be employed, which includes the network of FIG. 1 in a larger context that includes a proxy server, a translation component, and a client computing system having a user that is to externally access an internal resource of the network of FIG. 1.

FIG. 2 illustrates an environment 200 in which the principles described herein may be employed. The environment 200 includes the network 100 described above with respect to FIG. 1. However, the environment 200 also includes a proxy server computing system 201 (also called herein a "proxy" or "proxy server"). The proxy server 201 has a network address 211 (such as an IP address) that may be used to access the proxy server 201 over the Internet. The proxy server 201 may be a computing system, which has thereon computer executable instructions that are structured such that, when executed by one or more processors of the computing system, cause the computing system to perform as described herein. For instance, the proxy server 201 may be structured as described below for the computing system 800 of FIG. 8. Alternatively, the proxy server 201 may be structured as described below for the executable component 806 of the computing system 800.

The environment 200 also includes a translation component 202 that intervenes between the network 100 and a client computing system 210 (and its user 212) that are external to the network 100. The translation component 210 operates to convert internal identifiers to external uniform resource locators, which assists the external user 212 in accessing an internal resource 101 of the network 100. The translation component 202 may be a computing system, which has thereon computer executable instructions that are structured such that, when executed by one or more processors of the computing system, cause the computing system to perform as described herein. For instance, the translation component 202 may be structured as described below for the computing system 800 of FIG. 8. Alternatively, the translation component 202 may be structured as described below for the executable component 806 of the computing system 800.

The environment also includes a global domain name server 220. The global domain name server 220 is also called herein an "external" domain name server since it is able to resolve uniform resource locators to network addresses so long as those uniform resource locators are public. The external domain name server 220 cannot resolve uniform resource locators into network addresses for resources 101 that are internal to the network 100.

Figure 3:
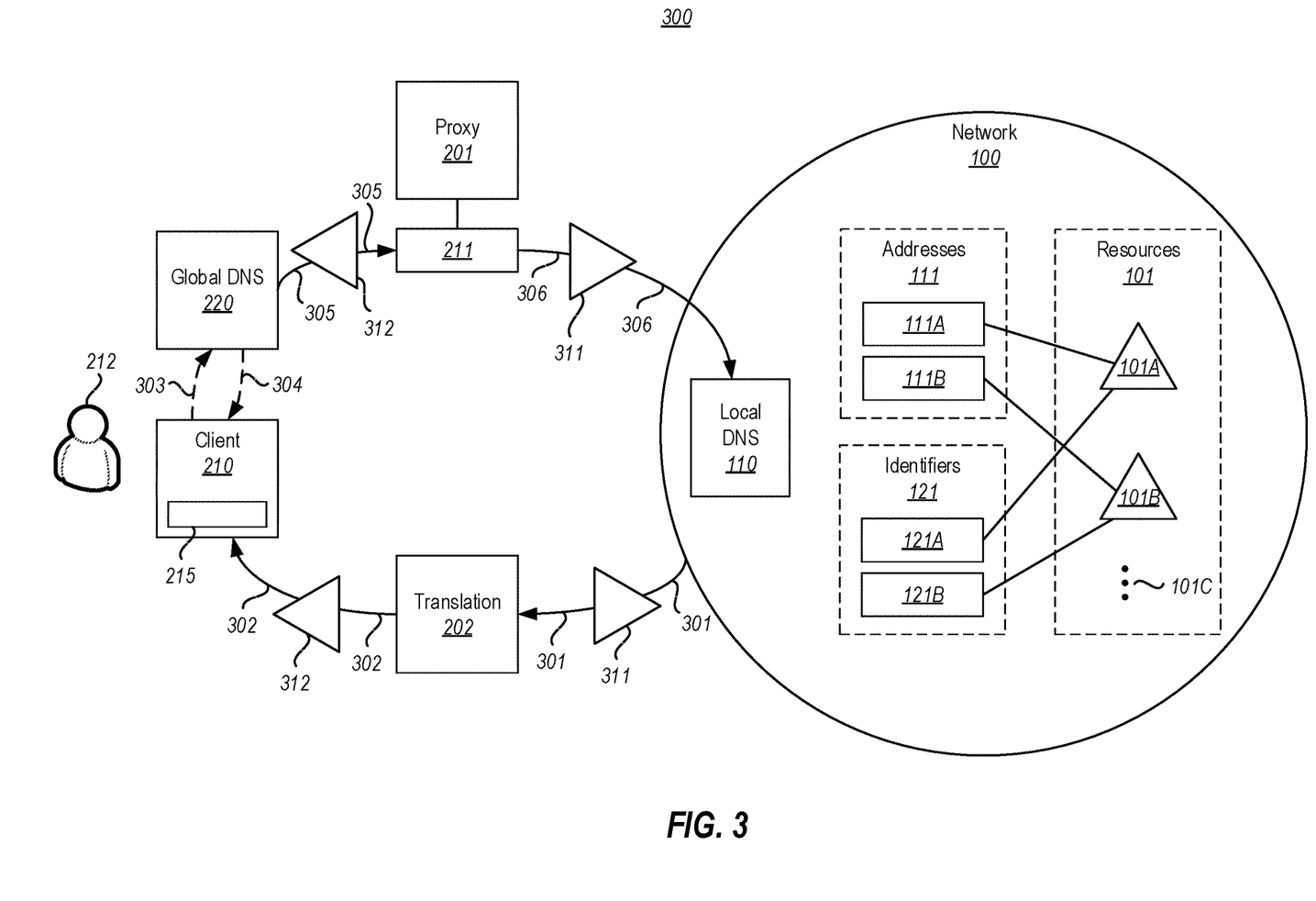
FIG. 3 illustrates an environment that is the same as the environment of FIG. 2, except that communications represented by arrows are additionally illustrated.
Figure 4:
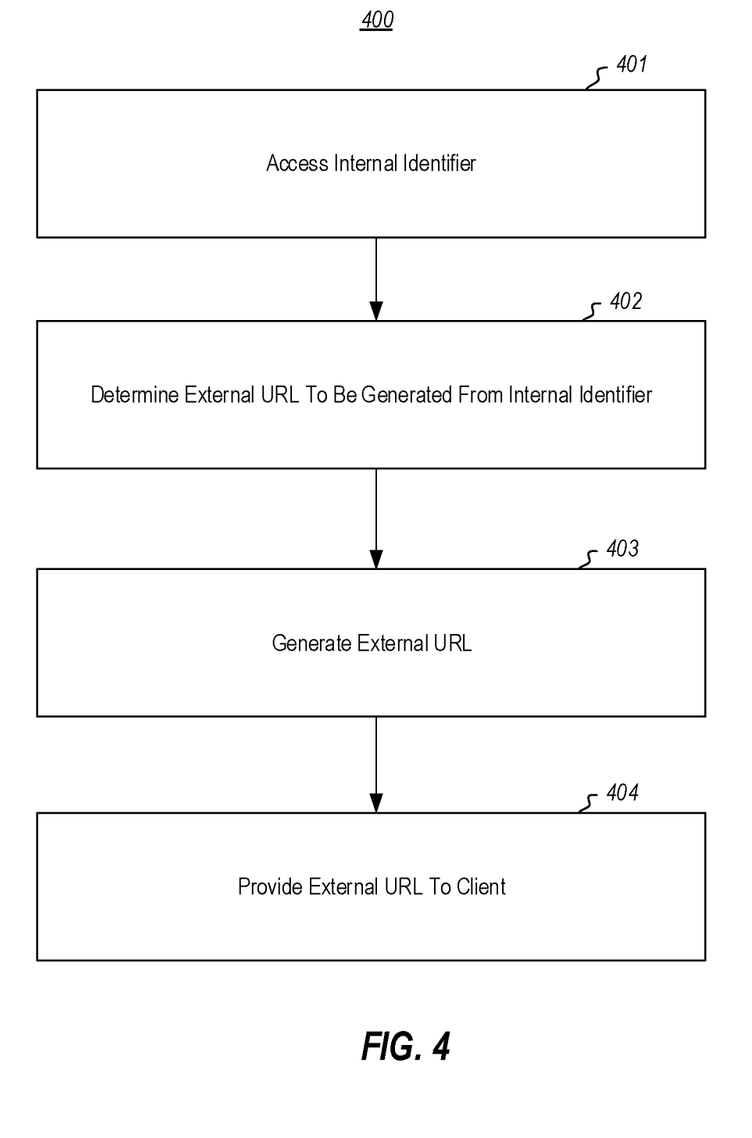
FIG. 4 illustrates a flowchart of a method for externally providing access to a resource that is internal to a network, and which may be performed by the translation component of FIG. 3 in order to generate an external uniform resource locator from an internal identifier.
Figure 5:
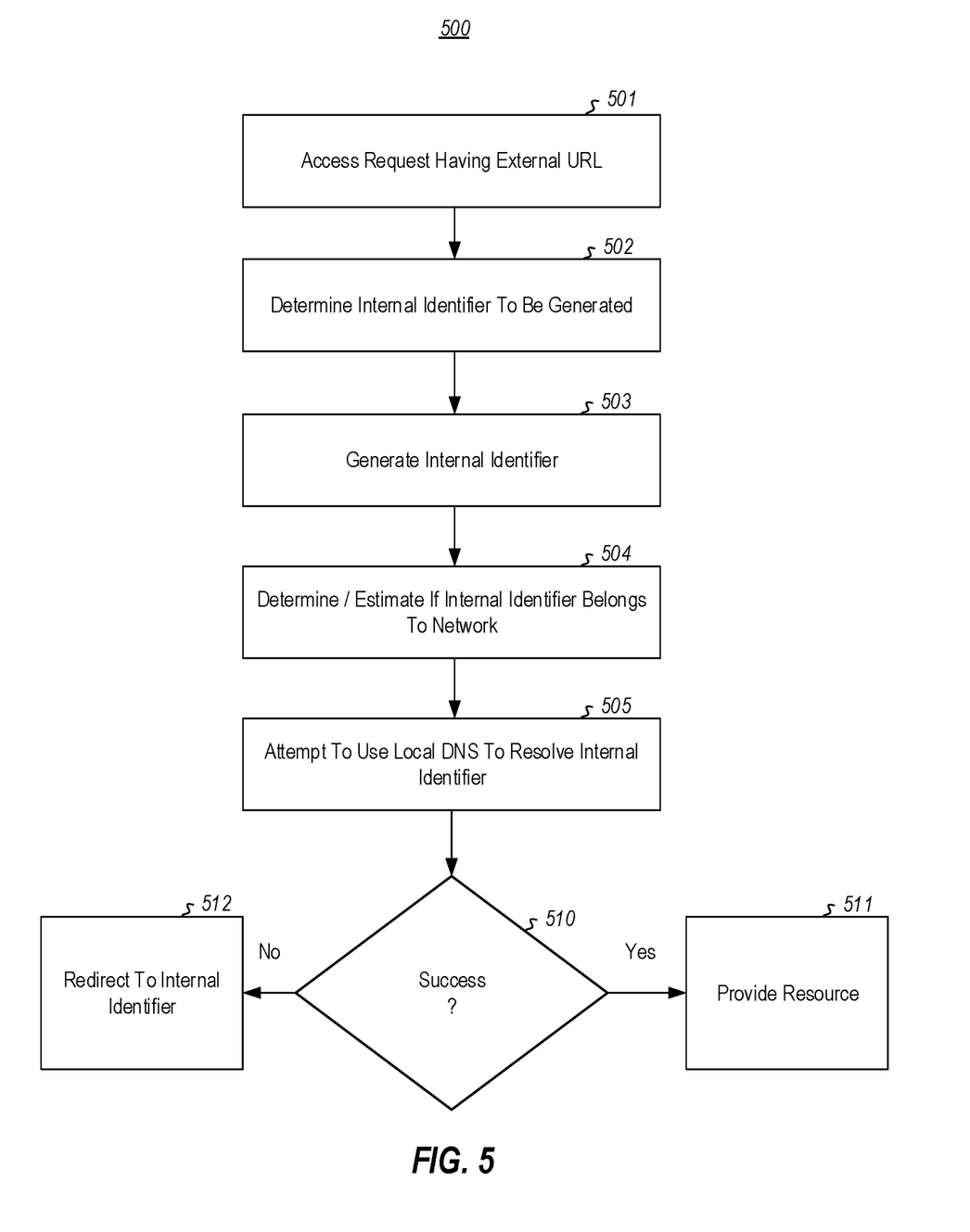
FIG. 5 illustrates a flowchart of a method for externally providing access to the resource that is internal to the network, and which may be performed by the proxy server of FIG. 3 in order to generate or extract the internal identifier from the external uniform resource locator.

FIG. 3 illustrates an environment 300 that is the same as the environment 200 of FIG. 2, except that communications (represented by arrows 301 through 306) are additionally illustrated. FIG. 4 illustrates a flowchart of a method 400 for externally providing access to a resource that is internal to a network, and which may be performed by the translation component 202 of FIG. 3 in order to translate an internal identifier into an external uniform resource locator. FIG. 5 illustrates a flowchart of a method 500 for externally providing access to the resource that is internal to the network, and which may be performed by the proxy server 201 of FIG. 3 in order to generate or extract the internal identifier from the external uniform resource locator. As the methods 400 and 500 may be performed in the context of the environment 300 of FIG. 3, FIGS. 3 through 5 will now be described with frequent reference to each other. We will begin with a description of the method 400 of FIG. 4, with frequent reference to the environment 300 of FIG. 3.

The method 400 includes accessing an internal identifier (act 401). In the example environment 300 of FIG. 3, the translation component 202 accesses the internal identifier 311 (represented by a rightward-pointing triangle) from the network 100 (as represented by arrow 301). The internal identifier 311 is resolvable, using an internal domain name server within a network, to an internal network address of an internal resource within the network. That said, the internal identifier is not resolvable to the internal resource using an external domain name server.

In the example environment 300 of FIG. 3, the local domain name server 110 may be able to resolve the internal identifier 311 to a corresponding internal network address 111 within the network 100. For instance, if the internal identifier 311 was the internal identifier 121A, the local domain name server 110 resolves the internal identifier 121A to the network address 111A, allowing for appropriate addressing and retrieval of the network resource 101A. Likewise, if the internal identifier 311 was the internal identifier 121B, the local domain name server 110 resolves the internal identifier 121B to the network address 111B, allowing for appropriate addressing and retrieval of the network resource 101B. However, the global domain name server 220 is not able to resolve the internal identifier 311 into a network address 111 of the network 100.

After accessing the internal identifier, the translation component automatically determines that an external uniform resource locator is to be generated using the identifier (act 402). For instance, this automatic determination might be performed by pattern matching on the internal identifier. As an example, the pattern might be something like "sharable\*" where if the internal identifier begins with the text "sharable\" no matter what that text is followed by, that internal identifier is a match. Thus, internal identifiers like "sharable\codebase" and "sharable\financials" would each match, and thus the translation component would determine (for those internal identifiers), a corresponding external uniform resource locator should be generated.

In response to this determination (act 402), the translation component generates an external uniform resource locator (act 403). In the example environment 300 of FIG. 3, the translation component 202 may, for instance, generate the external uniform resource locator 312 (represented by the leftward-pointing triangle). The external uniform resource locator 312 is structured to be resolved into the network address 211 of the proxy server 201. In one embodiment, the external uniform resource locator 312 may also include a network identifier that identifies the network 100 that originated the internal identifier.

Thus, internal identifiers, internal uniform resource identifiers, or internal uniform resource locators are represented in FIG. 3 as rightward-pointing triangles pointing towards the network 100 to represent that the internal identifiers are resolvable by the local domain name server 110 of the network 100, but are not resolvable by the global domain name server 220. Likewise, external uniform resource locators are represented in FIG. 3 as leftward-pointing triangles pointing away from the network 100 to represent that the external uniform resource locators are not resolvable by the global domain name server 220 into the internal identifier, but rather are only resolvable into the network address of a proxy server that serves the network 100.

The generation of the external uniform resource locator (act 403) may be performed using rules. Those rules might specify that a predetermined domain name (that matches the domain name of the proxy server 201) is to be used in the domain name portion of the uniform resource locator. The rules might further specify that the internal identifier is to actually be used (in direct form or after some transformation) into the path and/or parameters portion of the generated uniform resource locator.

Figure 6:
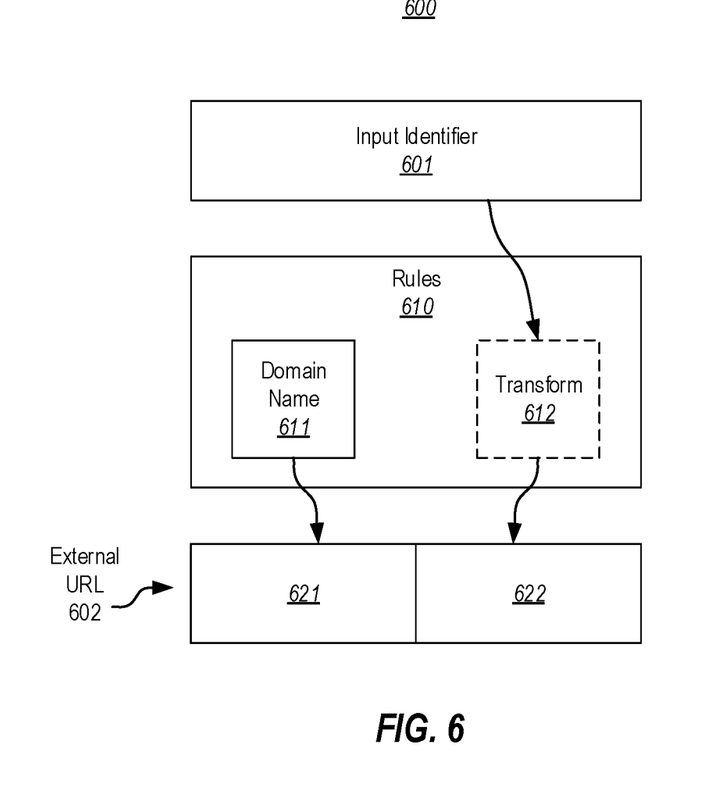
FIG. 6 illustrates a process flow associated with performing rules-based generation of an external uniform resource locator from an internal resource.

For instance, FIG. 6 illustrates a generation process 600 in which rules 610 are applied using an input internal identifier 601 to generate an output external uniform resource locator 602. For instance, the rules cause the predetermined domain name 611 to be populated into a predetermined portion 621 (e.g., the domain name portion and potentially some of the path and/or parameter portions) of the external uniform resource locator. Furthermore, the input identifier 601 (and potentially also a network identifier identifying the network 100) is then passed directly (or through a transform 612) to populate a second predetermined portion 622 (e.g., some or all of the path and/or parameters portion) of the external uniform resource locator 602.

The translation component then provides the external uniform resource locator to a client computing system (act 404). In the example environment 300 of FIG. 3, the translation component 202 provides (as represented by arrow 302) the external uniform resource locator 312 to the client computing system 210. The user 212 of the client computing system 210 may then select the uniform resource locator by interfacing with the control 215 that corresponds to the uniform resource locator 312.

As one example, a user inside the network 100 might send a message (such as an e-mail, chat entry, text) to the external user 212. That message could be intercepted by the translation component, which forwards the message on after replacing the internal identifier with the external uniform resource locator. In an alternative example, there might be no message at all. The internal user might simply cause a centralized control (accessible to both the internal user and the external user 212) to be posted and associate the control with the internal identifier. The translation component might alter the control as viewed from the outside of the network, such that the internal identifier is replaced with the external uniform resource locator. Thus, if the internal user selects the control, the internal identifier 311 is resolved by the local domain name server 110.

If the external user interfaces in a particular way with the control 305, the external uniform resource locator 312 is resolved by the global domain name server 220. Specifically, as represented by the dashed-lined arrow 303, the client computing system 210 communicates the external uniform resource locator 303 (or at least its domain name) to the global domain name server 220. As represented by dashed-lined arrow 304, the global domain name server 220 responds by providing the network address 211 of the proxy server 201. This causes a request having the external uniform resource locator 312 to be dispatched (as represented by arrow 305) to the proxy server 201. Then, the proxy server 201 may perform the method 500 of FIG. 5.

In accordance with FIG. 5, the proxy server accesses a request (act 501) having an external uniform resource locator from the requestor computing system. For instance, in the case of FIG. 3, the requestor computing system is the client computing system 210. The request and the accessing of that request are represented by the arrow 305 of FIG. 3. This external uniform resource locator is the external uniform resource locator 312 that was previously generated by the translation component 202.

The proxy server determines from the request that an internal identifier is to be generated from the external uniform resource locator (act 502). This determination may be performed by pattern matching on the external uniform resource locator. If the external uniform resource locator matches the pattern, then an internal identifier is generated. Thus, when generating the external uniform resource locator 312 in the first place, the translation component 202 makes sure that the external uniform resource locator 312 matches that pattern.

In response to the determination that the internal identifier is to be generated (act 502), the proxy server generates the internal identifier (act 503). This internal identifier may be the same internal identifier that was originally accessed by the translation component. For instance, in FIG. 3, the proxy server 201 may regenerate the internal identifier 311. Recall that this is the internal identifier 311 that is recognized and resolvable by the local domain name server 110 of the network 100.

Figure 7:
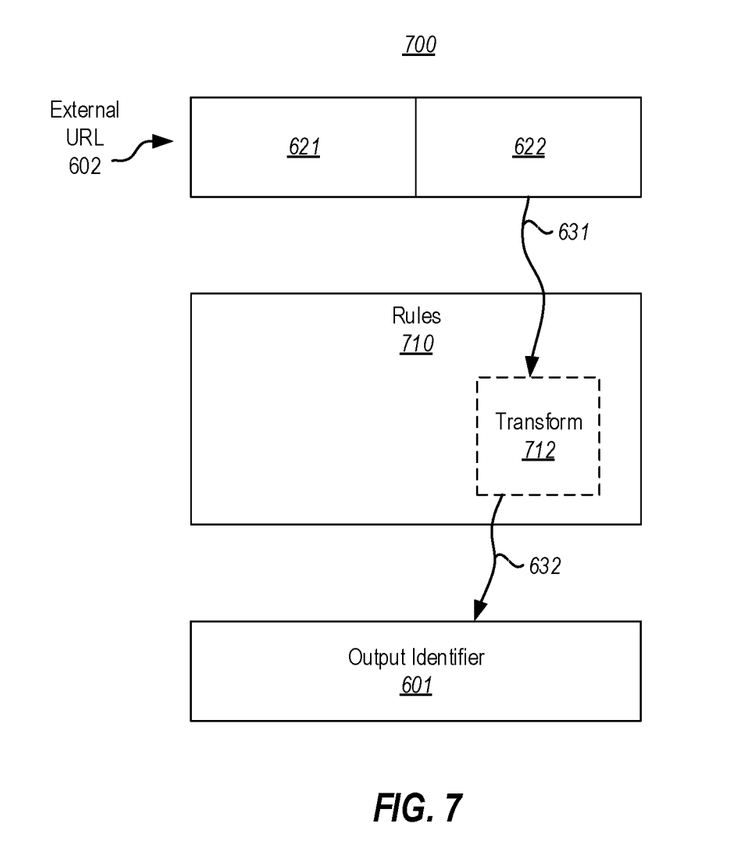
FIG. 7 illustrates a process flow associated with performing rules-based generation or extraction of an internal resource from an external resource locator.

The generation of the internal identifier (act 503) may be performed using rules. These rules might include extracting the identifier from a predetermined part of the external uniform resource locator. For instance, FIG. 7 illustrates a process 700 in which the generation of the internal identifier 601 from the external uniform resource locator 602 is performed using rules 700. Recall that in FIG. 6, the rules 610 caused the internal identifier 601 to be placed (after a potential transform) into the predetermined part 622 of the external uniform resource locator 602. The rules might differ depending on the identity of the network to which the internal identifier below.

In the reverse process of FIG. 7, the rules 710 extract the internal identifier (as represented by arrow 631) from the predetermined part 622 of the external uniform resource locator 602. Furthermore, after performing a potential transform 712, the process outputs (as represented by arrow 632) the internal identifier 601. The transform 712 is the reverse of the transform 612 that was used when inserting the internal identifier into the external uniform resource locator. If there was no transform 612 during the generation of the external uniform resource locator, then there need be no reverse transform 712 during the generation of the internal identifier.

Returning to FIG. 5, the process then estimates or determines that the internal identifier identifies a resource within the network (act 504). In one embodiment, the proxy server 201 serves only the network 201. Thus, any generated internal identifier can be estimated immediately to be associated with the network 100. On the other hand, the proxy server 201 may potentially serve multiple networks. In that case, the proxy server 201 may check the internal identifier against a list to estimate which network the internal identifier belongs to. Alternatively, the proxy server 201 may extract the network identifier that was included within the external uniform resource locator to identify the network. For security, it is preferred that the translation component 202 serves only one network 100, and that the proxy server 201 likewise serves only that same network 100. Furthermore, the proxy server may perform access control for the internal resource identified by the internal identifier.

The proxy server then attempts to utilize an internal domain name server that is internal to that network to resolve the internal identifier into a network address of an internal resource within the network (act 505). For instance, in FIG. 3, the proxy server 201 provides (as represented by arrow 306), the internal identifier 311 to the local domain name server 110.

If this attempt is successful (Yes in decision block 510), then the network 100 returns the internal resource to the proxy server 201, and the proxy server 201 then provides the internal resource to the client computing system (act 511). For instance, the proxy server 201 might obtain the network address associated with the internal identifier, and then use that network address to obtain the internal resource itself. The proxy server may then provide that network resource to the client computing system 210.

If the attempt is not successful (No in decision block 510), the proxy server may redirect the requestor computing system to the internal identifier itself (act 512). This is the same result as if the methods 400 and 500 had never been performed. Thus, in the case of success, the external user is provided with seamless access to the internal resource. Even in the case of failure, the external user may still try to access the internal resource using the internal identifier (e.g., by contacting the network administrator, logging into a VPN and using the internal identifier) and so forth. Thus, the principles described herein enhance the ability to appropriately share internal resources of a network with authorized users outside of that network. The methods 400 and 500 may be performed many times, and for different users and networks.

Finally, because the principles described herein operate in the context of a computer system, a computer system will be described with respect to FIG. 8. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
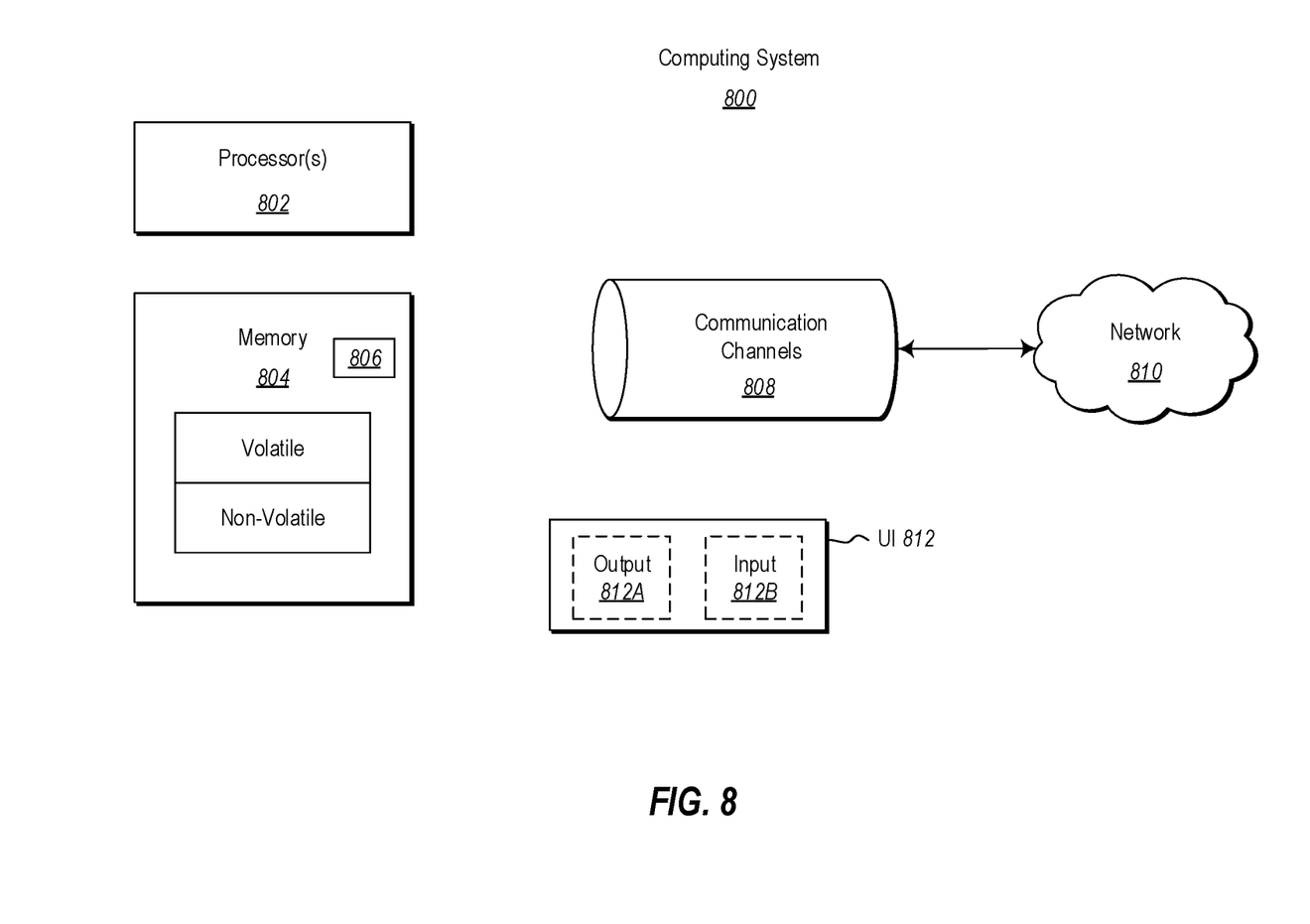
FIG. 8 illustrates an example computer system in which the principles described herein may be implemented.

As illustrated in FIG. 8, in its most basic configuration, a computing system 800 typically includes at least one hardware processing unit 802 and memory 804. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface 812 for use in interfacing with a user. The user interface 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, virtual reality, and so forth. Examples of input mechanisms 812B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having stored thereon computer-executable instructions that are structured such that, when executed by the one or more processors, cause the computing system to perform at least:
receive an identifier from a client computing system via a second network, wherein the identifier is resolvable, using an internal domain name server within a first network, to an internal network address of a resource within the first network, but the identifier not being resolvable to that resource using an external domain name server;
automatically determine that an external uniform resource locator is to be generated using the identifier;
in response to the determination, generate an external uniform resource locator that is structured so as to be resolved by the external domain name server to a server computing system that is configured to regenerate the identifier to the internal network address of the resource based on the external uniform resource locator; and
send the external uniform resource locator to the client computing system via the second network that is external to the first network, causing the client computing system to associate the external uniform resource locator with the resource that is internal to the first network so that the external uniform resource locator is accessed to obtain access from the second network that is external to the first network to the resource that is internal to the first network,
wherein the computing system is in the second network that is external to the first network.

2. The computing system in accordance with claim 1, the computing system being used to also access the external uniform resource locator.

3. The computing system in accordance with claim 1, wherein the automatic determination that an external uniform resource locator is to be generated is performed by pattern matching on the accessed identifier.

4. The computing system in accordance with claim 1, wherein the generation of the external uniform resource locator from the identifier is performed using rules.

5. The computing system in accordance with claim 4, the rules comprising using a predetermined domain name that matches the server computing system.

6. The computing system in accordance with claim 5, the rules comprising using the identifier in a path of the external uniform resource locator.

7. The computing system in accordance with claim 5, the rules comprising using the identifier as a parameter of the external uniform resource locator.

8. The computing system in accordance with claim 4, the rules comprising using the identifier in a path or as a parameter of the external uniform resource locator.

9. The computing system in accordance with claim 1, the identifier being an internal uniform resource identifier that is recognized within the first network by a local domain name server, the generated external uniform resource locator including a network identifier that identifies the second network.

10. A method, implemented at a computing system, for externally providing access to a resource that is internal to a network, the method comprising:
   receiving an identifier from a client computing system via a second network, wherein identifier is resolvable, using an internal domain name server within a first network, to an internal network address of the resource within the first network, but the identifier not being resolvable to that resource using an external domain name server;
   automatically determining that an external uniform resource locator is to be generated using the identifier;
   in response to the determination, generating an external uniform resource locator that is structured so as to be resolved by the external domain name server to a server computing system that is configured to regenerate the identifier to the internal network address of the resource based on the external uniform resource locator; and
   providing the external uniform resource locator to the client computing system via the second network that is external to the first network, causing the client computing system to associate the external uniform resource locator with the resource that is internal to the first network so that the external uniform resource locator is accessed to obtain access from the second network that is external to the first network to the resource that is internal to the first networks,
   wherein the computing system is in the second network that is external to the first network.

11. The method in accordance with claim 10, the identifier being a first identifier, the internal network address being a first internal network address, the resource being a first resource, the external uniform resource locator being a first uniform resource locator being a first uniform resource locator, the method further comprising:
   accessing a second identifier that is resolvable, using the internal domain name server, to a second internal network address of a second resource within the first network, but the second identifier not being externally resolvable to that second resource using an external domain name server;
   automatically determining that an external uniform resource locator is to be generated using the second identifier;
   in response to the determination that an external uniform resource locator is to be generated using the second identifier, generating a second external uniform resource locator that is structured so as to be externally resolved to the server computing system, the server computing system being configured to:
      determine the second identifier from the second external uniform resource locator,
      attempt to utilize the internal domain name server to resolve the second identifier to the second internal network address of the second resource, and
      if the attempt is successful, provide the second resource to an entity that caused the second external uniform resource locator to be accessed; and
   providing the second external uniform resource locator so that the second external uniform resource locator is to be accessed to obtain access from external to the internal network to the second resource that is internal to the internal network.

12. The method in accordance with claim 10, the internal network being a first network, the internal domain name server being a first internal domain name server, the identifier being a first identifier, the internal network address being a first internal network address, the resource being a first resource, the external uniform resource locator being a first uniform resource locator, the method further comprising:
   accessing a second identifier that is resolvable, using a second internal domain name server within a second network, to a second internal network address of a second resource within the second network, but the second identifier not being externally resolvable to that second resource using an external domain name server;
   automatically determining that an external uniform resource locator is to be generated using the second identifier;
   in response to the determination that an external uniform resource locator is to be generated using the second identifier, generating a second external uniform resource locator that is structured so as to be externally resolved to the server computing system, is the server computing system being configured to:
      determine the second identifier from the second external uniform resource locator,
      attempt to utilize the second internal domain name server to resolve the second identifier to the second internal network address of the second resource, and
      if the attempt is successful, provide the second resource to an entity that caused the second external uniform resource locator to be accessed; and
   providing the second external uniform resource locator so that the second external uniform resource locator to be accessed to obtain access from external to the second network to the second resource that is internal to the second network.

13. The method in accordance with claim 10, wherein the automatic determination that an external uniform resource locator is to be generated is performed by pattern matching on the accessed identifier.

14. The method in accordance with claim 10, wherein the generation of the external uniform resource locator from the identifier is performed using rules.

15. The method in accordance with claim 14, the rules comprising using a predetermined domain name that matches the server computing system.

16. The method in accordance with claim 15, the rules comprising using the identifier in a path of the external uniform resource locator.

17. The method in accordance with claim 15, the rules comprising using the identifier as a parameter of the external uniform resource locator, the generated external uniform resource locator including a network identifier that identifies the second network.

18. A computer program product comprising one or more hardware storage devices having stored thereon computer-executable instructions that are structured such that, when the computer-executable instructions are executed by one or more processors of a computing system, the computer-executable instructions cause the computing system to perform at least:
- receive an internal uniform resource locator from a client computing system via a second network, wherein the internal uniform resource locator is resolvable, using an internal domain name server within a first network, to an internal network address of a resource within the first network, but the internal uniform resource locator not being resolvable to that resource using an external domain name server;
- automatically determine that an external uniform resource locator is to be generated using the internal uniform resource locator;
- in response to the determination, generate an external uniform resource locator that is structured so as to be resolved by the external domain name server to a server computing system that is configured to regenerate the internal uniform resource locator based on the external uniform resource locator; and
- send the external uniform resource locator to the client computing system via the second network that is external to the first network, causing the client computing system to associate the external uniform resource locator with the internal uniform resource locator, so that the external uniform resource locator is accessed to obtain access from the second network that is external to the first network to the resource that is addressed by the internal uniform resource locator in the first network,
- wherein the computing system is in the second network that is external to the first network.

* * * * *

UNITED STATES PATENT AND TRADEMARK OFFICE
CERTIFICATE OF CORRECTION

PATENT NO. : 11,233,749 B2  
APPLICATION NO. : 16/661838  
DATED : January 25, 2022  
INVENTOR(S) : Guy Lewin et al.

Page 1 of 1

It is certified that error appears in the above-identified patent and that said Letters Patent is hereby corrected as shown below:

On the Title Page

Item (73), Assignee:  
Line 1, change "MICROSOFT TECHNOLOGLY LICENSING, LLC" to --MICROSOFT TECHNOLOGY LICENSING, LLC--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*